United States Patent
Patel et al.

(10) Patent No.: US 10,505,918 B2
(45) Date of Patent: Dec. 10, 2019

(54) CLOUD APPLICATION FINGERPRINT

(71) Applicant: Cisco Technology, Inc., San Jose, CA (US)

(72) Inventors: Deep Chand Patel, Sunnyvale, CA (US); Varagur Chandrasekaran, Fremont, CA (US); Srinivas Pitta, Cupertino, CA (US); Shrawan Chittoor Surender, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 15/636,114

(22) Filed: Jun. 28, 2017

(65) Prior Publication Data
US 2019/0007394 A1    Jan. 3, 2019

(51) Int. Cl.
   H04L 29/06    (2006.01)
   G06F 21/44    (2013.01)
   H04L 29/08    (2006.01)

(52) U.S. Cl.
   CPC .......... *H04L 63/0823* (2013.01); *G06F 21/44* (2013.01); *H04L 63/123* (2013.01); *H04L 63/1425* (2013.01); *H04L 63/20* (2013.01); *H04L 67/10* (2013.01); *H04L 67/146* (2013.01); *H04L 63/0281* (2013.01)

(58) Field of Classification Search
   CPC . H04L 63/0823; H04L 63/20; H04L 63/0281; H04L 67/146; H04L 67/10; G06F 21/44
   See application file for complete search history.

(56) References Cited

U.S. PATENT DOCUMENTS

| | | | |
|---|---|---|---|
| 6,754,699 B2 * | 6/2004 | Swildens | G06F 9/505 370/229 |
| 7,890,549 B2 * | 2/2011 | Elad | G06Q 30/02 706/11 |
| 8,407,471 B1 * | 3/2013 | Sobel | H04L 61/1511 709/223 |
| 8,484,566 B2 * | 7/2013 | Madhavan | G06F 17/2211 715/742 |

(Continued)

FOREIGN PATENT DOCUMENTS

WO    2016138067 A1    9/2016

OTHER PUBLICATIONS

Xu et al., Autoprobe: Towards Automatic Active Malicious Server Probing Using Dynamic Binary Analysis, Nov. 2014, ACM.*

(Continued)

*Primary Examiner* — David Garcia Cervetti
(74) *Attorney, Agent, or Firm* — Edell, Shapiro & Finnan, LLC

(57) ABSTRACT

In one example, a security application that interfaces one or more cloud application clients in an enterprise network and one or more cloud applications detects a request made by one of the one or more cloud application clients to access a cloud application. The security application sends one or more prompts to the cloud application for one or more responses reflecting current empirical data obtained from the cloud application. The security application receives, from the cloud application, the one or more responses, and generates an application fingerprint that includes the one or more responses.

20 Claims, 6 Drawing Sheets

(56) References Cited

U.S. PATENT DOCUMENTS

| | | | | |
|---|---|---|---|---|
| 9,426,257 | B1* | 8/2016 | Pashkov | H04L 67/42 |
| 9,438,565 | B2* | 9/2016 | Cohen | H04L 67/2823 |
| 9,589,130 | B2* | 3/2017 | Shanklin | G06F 21/51 |
| 10,024,963 | B2* | 7/2018 | Zimdars | G01S 17/88 |
| 10,257,212 | B2* | 4/2019 | Antonakakis | G06F 21/577 |
| 2003/0097564 | A1* | 5/2003 | Tewari | H04L 12/14 |
| | | | | 713/171 |
| 2004/0006693 | A1* | 1/2004 | Vasnani | H04L 63/0807 |
| | | | | 713/168 |
| 2005/0192965 | A1* | 9/2005 | Ferreira | G06F 9/465 |
| 2006/0069801 | A1* | 3/2006 | Rich | G06F 9/5072 |
| | | | | 709/232 |
| 2008/0082354 | A1* | 4/2008 | Hurry | G06Q 30/00 |
| | | | | 705/317 |
| 2011/0265077 | A1* | 10/2011 | Collison | G06F 8/71 |
| | | | | 717/172 |
| 2011/0314389 | A1* | 12/2011 | Meredith | G06F 8/60 |
| | | | | 715/751 |
| 2012/0131143 | A1* | 5/2012 | Nakazawa | H04L 9/3247 |
| | | | | 709/218 |
| 2012/0210436 | A1* | 8/2012 | Rouse | G06F 21/125 |
| | | | | 726/26 |
| 2012/0255022 | A1* | 10/2012 | Ocepek | G06F 21/552 |
| | | | | 726/25 |
| 2012/0324113 | A1* | 12/2012 | Prince | H04L 67/2814 |
| | | | | 709/226 |
| 2012/0324227 | A1* | 12/2012 | Swildens | G06Q 20/401 |
| | | | | 713/172 |
| 2013/0111547 | A1* | 5/2013 | Kraemer | G06F 21/552 |
| | | | | 726/1 |
| 2013/0254880 | A1* | 9/2013 | Alperovitch | G06F 21/51 |
| | | | | 726/22 |
| 2014/0006347 | A1* | 1/2014 | Qureshi | H04L 63/20 |
| | | | | 707/621 |
| 2014/0289511 | A1* | 9/2014 | Tuch | H04L 63/0823 |
| | | | | 713/156 |
| 2015/0074759 | A1* | 3/2015 | Shanklin | G06F 21/51 |
| | | | | 726/3 |
| 2015/0121449 | A1* | 4/2015 | CP | H04L 63/145 |
| | | | | 726/1 |
| 2016/0014123 | A1* | 1/2016 | Shin | G06F 21/51 |
| | | | | 713/152 |
| 2016/0036855 | A1 | 2/2016 | Gangadharappa et al. | |
| 2016/0212099 | A1* | 7/2016 | Zou | H04L 63/0263 |
| 2016/0241528 | A1* | 8/2016 | Kulkarni | H04L 67/2842 |
| 2016/0285847 | A1* | 9/2016 | Oberheide | G06F 9/00 |
| 2017/0048198 | A1* | 2/2017 | Frank | H04L 63/0263 |
| 2017/0171187 | A1* | 6/2017 | Yin | H04L 63/083 |
| 2017/0177316 | A1* | 6/2017 | Hajost | G06F 8/71 |
| 2017/0250976 | A1* | 8/2017 | Ramachandran | G06F 9/45545 |
| 2017/0344407 | A1* | 11/2017 | Jeon | G06F 9/545 |
| 2017/0346853 | A1* | 11/2017 | Wyatt | H04L 43/12 |
| 2017/0359326 | A1* | 12/2017 | Garcia | H04L 63/08 |
| 2017/0359344 | A1* | 12/2017 | Kaal | H04L 61/1511 |
| 2018/0032741 | A1* | 2/2018 | Hogben | G06F 8/60 |
| 2018/0113684 | A1* | 4/2018 | Dawson | G06F 8/36 |
| 2018/0114000 | A1* | 4/2018 | Taylor | G06F 21/12 |
| 2018/0136941 | A1* | 5/2018 | Kulick | G06F 9/4406 |
| 2018/0167361 | A1* | 6/2018 | Xiao | H04L 29/06 |
| 2018/0287802 | A1* | 10/2018 | Brickell | H04L 9/14 |
| 2018/0359244 | A1* | 12/2018 | Cockerill | H04L 63/0853 |

OTHER PUBLICATIONS

Wang et al., WhoWas: A Platform for Measuring Web Deployments on IaaS Clouds, ACM, 2014.*
Fernandez, et al., "Cloud Access Security Broker (CASB): A pattern for secure access to cloud services," 4th Asian Conference on Pattern Languages of Programs, Asian PLoP'15, Mar. 2015, 8 pages.
Cisco Cloudlock, "Cisco Cloudlock: Secure Cloud Apps," Datasheet, www.cisco.com/c/en/us/products/security/cloudlock/datasheet-listing.html, Feb. 2017, 2 pages.
Cisco Cloudlock, "Cloud User Security," Datasheet, www.cisco.com/c/en/us/products/security/cloudlock/datasheet-listing.html, Feb. 2017, 2 pages.
Cisco Cloudlock, "Cisco Cloudlock: Secure Cloud Data," Datasheet, www.cisco.com/c/en/us/products/security/cloudlock/datasheet-listing.html, Feb. 2017, 2 pages.
Cisco Cloudlock, "The CASB & Cloud Cybersecurity Platform," Datasheet, https://resources.cloudlock.com/data-sheets/cloudlock-security-fabric, Feb. 2017, 2 pages.
Cisco, "Cisco Web Security Appliance," Solution Overview, http://www.cisco.com/c/en/us/products/collateral/security/web-security-appliance/solution-overview-c22-732948.pdf, Dec. 2016, 7 pages.
Netskope, "About Cloud Access Security Brokers," https://www.netskope.com/company/about-casb/, retrieved Jun. 28, 2017, 6 pages.

* cited by examiner

CLOUD APPLICATION FINGERPRINT

TECHNICAL FIELD

The present disclosure relates to generating a cloud application fingerprint.

BACKGROUND

Cloud-hosted applications (also referred to herein as "cloud applications"), are proliferating in number and variety. Users can access these cloud applications from within a network (e.g., an enterprise network), which can create certain risks/threats to the network/enterprise. Enterprises sometimes use a cloud application security function to deal with compliance, data security, threat detection and mitigation, etc. The security function may sit between an enterprise network and a cloud provider and enforces security policies for cloud access.

DESCRIPTION OF EXAMPLE EMBODIMENTS

Overview

In one example, a security application interfaces one or more cloud application clients in an enterprise network and one or more cloud applications. The security application detects a request made by one of the one or more cloud application clients to access a cloud application. The security application sends one or more prompts to the cloud application for one or more responses reflecting current empirical data obtained from the cloud application. The security application receives, from the cloud application, the one or more responses, and generates an application fingerprint that includes the one or more responses.

Example Embodiments

Figure 1A:
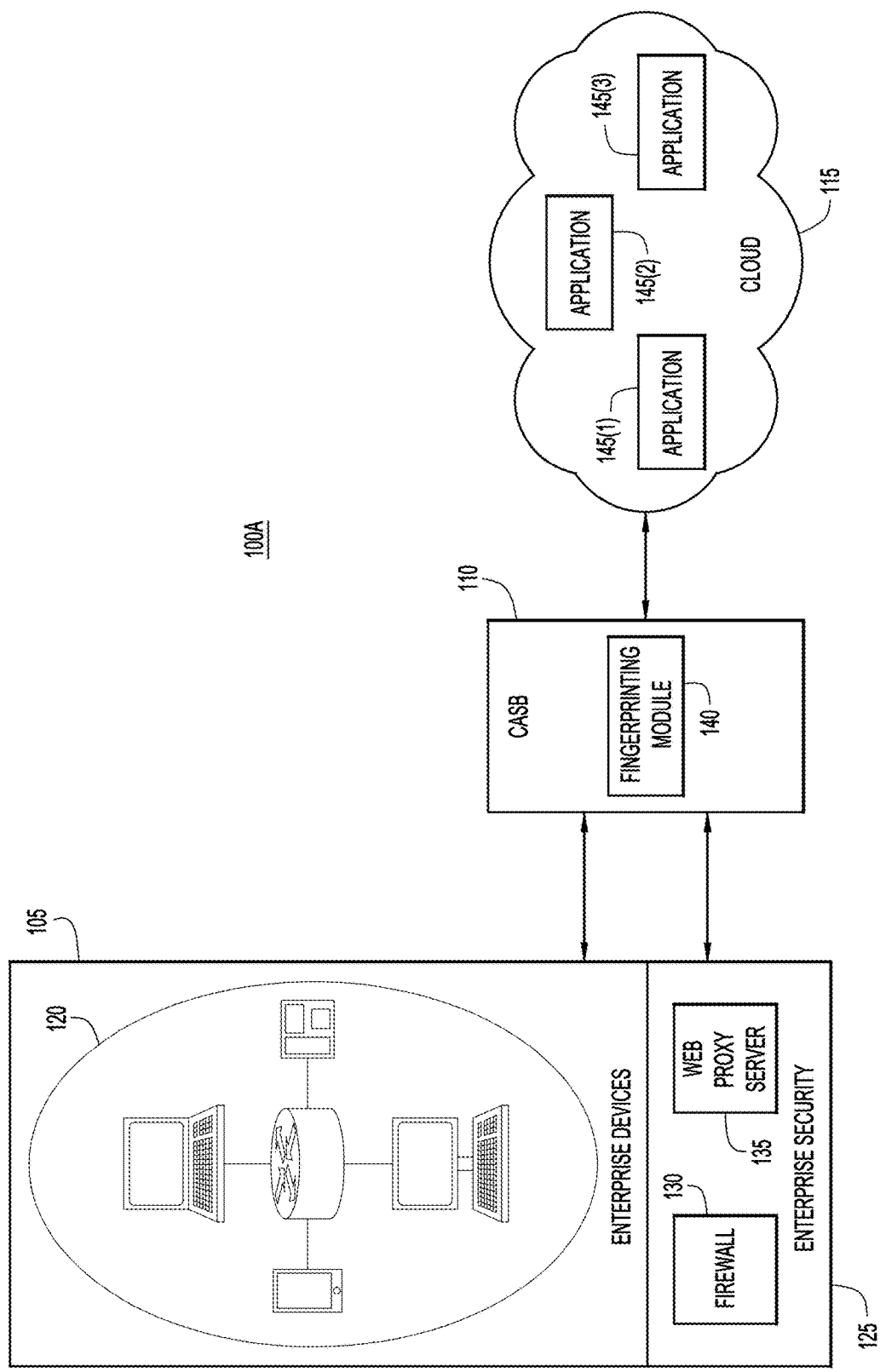
FIGS. 1A and 1B are high-level system diagrams depicting application fingerprinting environments, according to example embodiments.
Figure 1B:
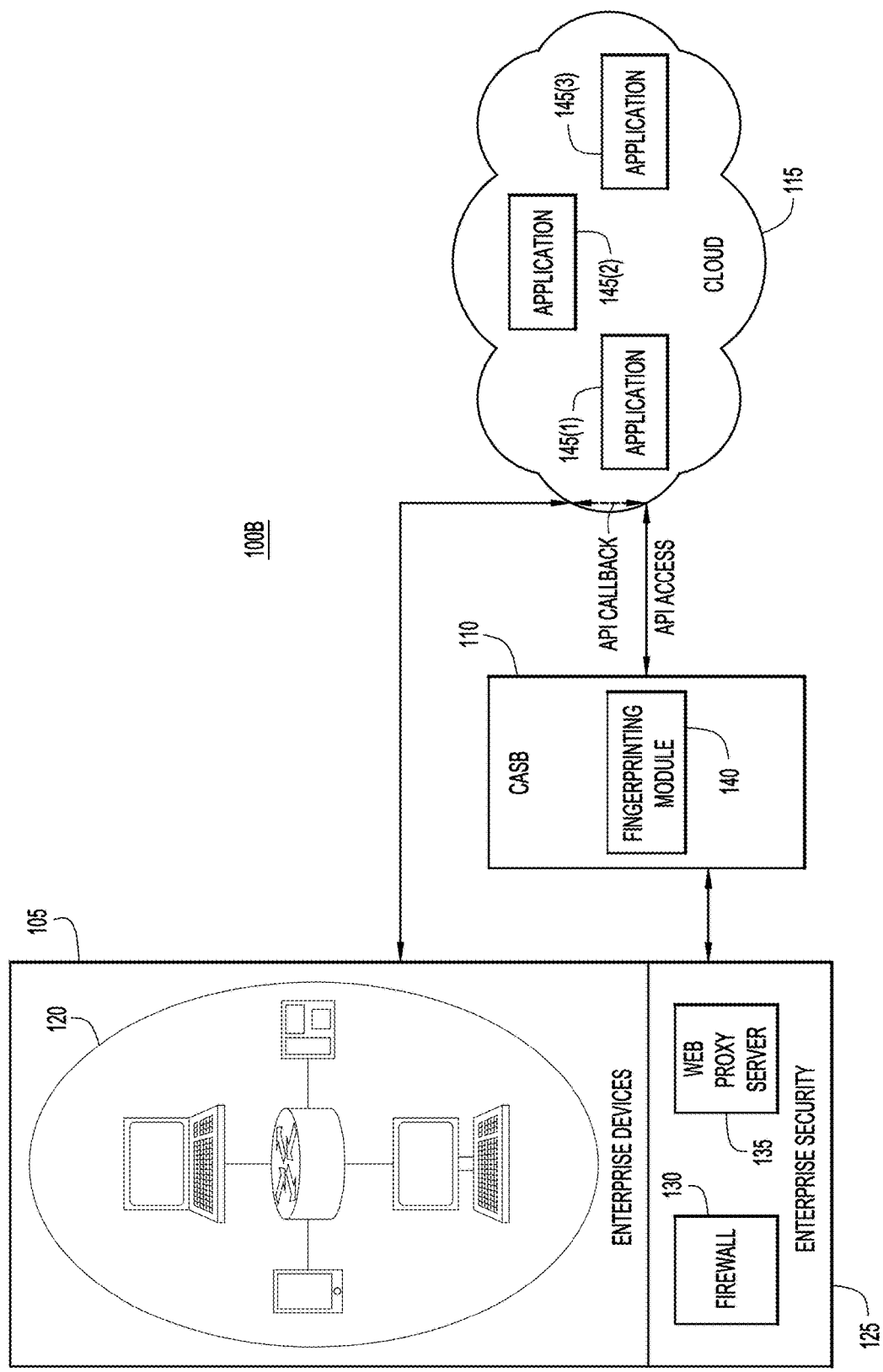

With reference made to FIGS. 1A and 1B, system diagrams of example cloud application fingerprinting environments 100A and 100B are shown, in accordance with examples presented herein. FIG. 1A illustrates operations in "proxy mode," and FIG. 1B illustrates operations in "application programming interface (API) mode." The techniques described herein are compatible with both the proxy mode and the API mode.

Turning first to FIG. 1A, the example environment 100A includes an enterprise network 105, a security application (also referred to herein as a Cloud Application Security Broker (CASB)) 110, and a cloud/datacenter network 115. The enterprise network 105 includes enterprise devices 120 (e.g., switches, routers, phones, computers, laptops, tablets, etc.) and enterprise security functions 125, including a firewall 130 and a web proxy server 135, for example. The CASB 110 includes a fingerprinting function or module 140. The cloud/datacenter network 115 includes cloud applications 145(1)-145(3). It should be understood that there may be more or fewer than three cloud applications in the cloud 115.

In proxy mode, the network devices 120 are configured to use the CASB 110 as a proxy for the cloud applications 145(1)-145(3). The CASB 110 monitors traffic of every type in order to enforce a security policy with respect to cloud applications 145(1)-145(3). In one example, a user submits a request (e.g., a Hypertext Transfer Protocol (HTTP) request) to access cloud application 145(2) from within the enterprise network 105 using a cloud application client (e.g., one of enterprise devices 120). The CASB 110 monitors the resulting traffic (e.g., via web proxy server 135) and enforces security policies (e.g., by denying the user access to the cloud application 145(2) using firewall 130). As explained in greater detail below, the CASB 110 uses fingerprinting module 140 to generate a fingerprint of cloud application 145(2). This fingerprint helps the CASB determine whether the cloud application 145(2) is trustworthy.

A CASB can prevent traffic associated with a cloud application if the cloud application is flagged in a database of cloud applications as being harmful/dangerous. However, when a harmful/dangerous cloud application being accessed by the user is absent from the database, the CASB permits traffic to/from the cloud application, thereby threatening the security of the network. Further, a conventional CASB or similar function is unable to determine whether an application has gone "rogue" (i.e., the application was previously safe but has since become compromised). For example, an enterprise may own a cloud application that provides a service to users/customers. Although these cloud applications sometimes go rogue, a conventional CASB cannot recognize this because the CASB "trusts" the cloud application by virtue of the enterprise owning the cloud application.

In contrast to conventional approaches, fingerprint module 140 enables the CASB 110 to recognize when a cloud application (e.g., cloud application 145(2)) has gone rogue according to the embodiments presented herein. Briefly, upon detecting the user request to access cloud application 145(2), CASB 110 sends a prompt to the cloud application 145(2) for a response reflecting current empirical data obtained from the cloud application 145(2). After receiving the response from the cloud application 145(2), the CASB 110 generates an application fingerprint that includes or is based on the response(s). The CASB 110 may then determine whether the application fingerprint matches a previous application fingerprint that includes a previous response reflecting empirical data previously obtained from the cloud application. If the application fingerprint does not match the previous application fingerprint, the CASB 110 may enforce a security policy with respect to the cloud application 145(2). For example, the CASB 110 may deny access to the cloud application 145(2), send an alert to the user or a network administrator, or log the discrepancy in a database.

As mentioned, FIG. 1B illustrates example operations in API mode. Like the example of FIG. 1A, a user in the enterprise network 105 submits an HTTP or other request to access cloud application 145(2) from within the enterprise network 105. In API mode, cloud application 145(2) passes to the CASB 110 callbacks regarding access and related events. For example, the cloud application 145(2) may inform the CASB 110 that the user has requested to access a certain record. As such, the CASB 110 is required to monitor only relevant traffic (e.g., traffic that is relevant to generating an application fingerprint and enforcing security policies). This is in contrast to proxy mode, which requires the CASB 110 to monitor every type of traffic. Many cloud applications provide API support for API mode. Unlike proxy mode, which covers HTML traffic only to Software-as-a-Service (SaaS) cloud applications, API mode covers all cloud applications, including SaaS, Platform-as-a-Service (PaaS), and Infrastructure-as-a-Service (IaaS) cloud applications.

Like proxy mode, API mode is compatible with the fingerprinting module 140 to enable the CASB 110 to recognize when a cloud application has gone rogue. That is, in API mode, the CASB 110 may send a prompt to, for example, the cloud application 145(2), receive response(s) to the prompts, generate an application fingerprint, determine whether the application fingerprint matches a previous application fingerprint, etc., as described above.

Figure 2:
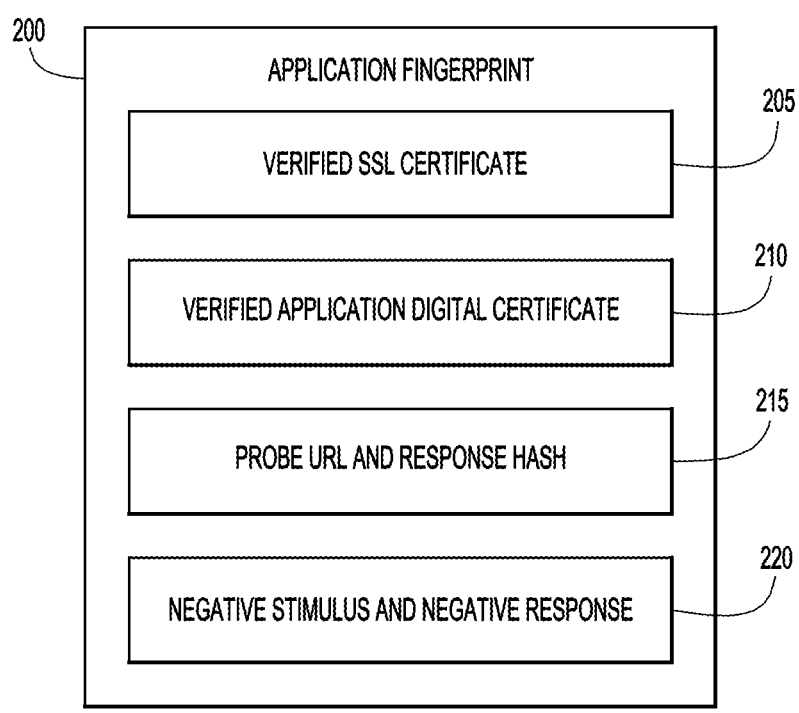
FIG. 2 is a block diagram illustrating a logical structure of an application fingerprint, according to an example embodiment.

With reference to FIG. 2 and with continued reference to FIGS. 1A and 1B, shown is the logical structure of an application fingerprint 200 in accordance with examples presented herein. CASB 110 generates application fingerprint 200 in response to the user request to access cloud application 145(2). In one example, the application fingerprint 200 includes a verified Secure Sockets Layer (SSL) certificate 205, a verified application digital certificate 210, a probe Uniform Resource Locator (URL) and response hash 215, and a negative stimulus and negative response 220. As mentioned, the CASB 110 may determine whether the application fingerprint 200 matches a previous application fingerprint in order to verify the authenticity of cloud application 145(2).

Figure 3:
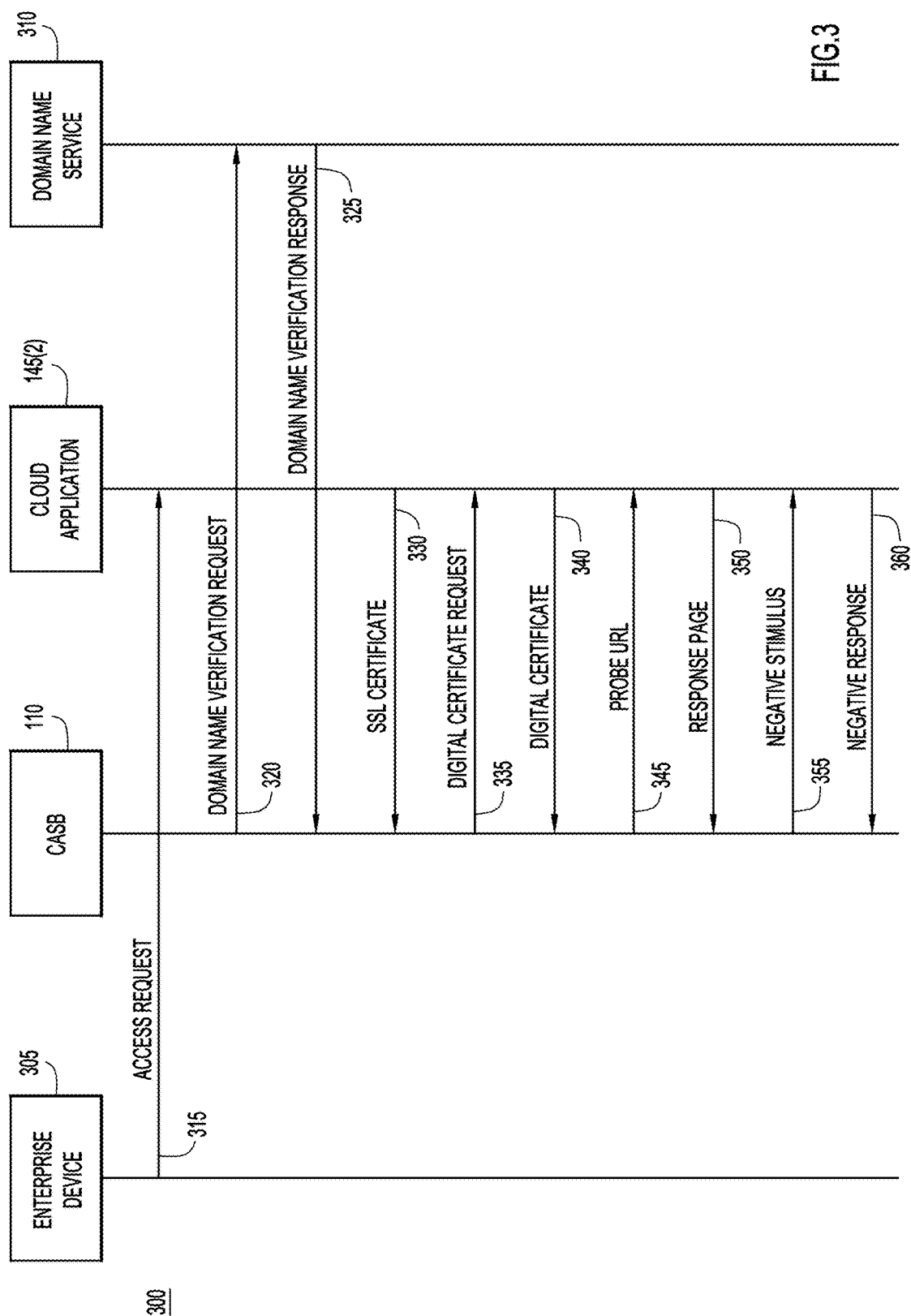
FIG. 3 is a ladder diagram illustrating how a security application generates an application fingerprint, according to an example embodiment.

Turning now to FIG. 3, and with continued reference to FIGS. 1A, 1B and 2, shown is an example sequence diagram for a process 300 illustrating the generation of application fingerprint 200. The sequence diagram illustrates communications between an enterprise device 305, CASB 110, cloud application 145(2), and a domain name service 310. The enterprise device 305 is one of the enterprise devices 120 shown in FIGS. 1A and 1B. The domain name service 310 may identify specific domain names as being untrustworthy.

At 315, a user sends, from enterprise device 305, a request to access the cloud application 145(2). The request may be an HTTP request that includes a domain name corresponding to the cloud application 145(2). In proxy mode, the enterprise device 305 sends the request to the CASB 110, and in API mode, the enterprise device 305 sends the request directly to the cloud application 145(2).

Operations 320, 325, and 330 relate to the verified SSL certificate 205 in the application fingerprint 200. At 320, the CASB 110 sends a domain name verification request for the domain name in the request to the domain name service 310. At 325, the domain name service 310 sends, to the CASB 110, a domain name verification response to the domain name verification request. If the response indicates that the domain name is untrustworthy, the CASB 110 may determine that the cloud application 145(2) is untrustworthy, cease generating the application fingerprint 200, and (for example) prevent the user from accessing the cloud application 145(2). If the response indicates that the domain name in the request is trustworthy, the CASB 110 verifies, via the domain name service, the domain name included in the request.

At 330, the CASB 110 receives, from the cloud application 145(2), the Secure Sockets Layer (SSL) certificate 205. If the SSL certificate 205 is signed by a standard certificate authority (CA), the CASB 110 attempts to verify the SSL certificate 205 against standard CA credentials maintained by the CASB 110. If an SSL certificate cannot be verified, the CASB 110 may determine that the cloud application 145(2) is untrustworthy, cease generating the application fingerprint 200, and (for example) prevent the user from accessing the cloud application 145(2). If the CASB 110 verifies the SSL certificate 205, the CASB 110 stores the verified SSL certificate 205 in the application fingerprint 200.

Operations 335 and 340 relate to the verified application digital certificate 210 in the application fingerprint 200. In API mode, the CASB 110 may determine, via an API, whether a third-party signed application digital certificate 210 is available. If the digital certificate 210 is unavailable, the CASB 110 may proceed to 345 (described below). If the digital certificate 210 is available, the CASB 110 obtains and verifies the digital certificate 210. For instance, at 335, the CASB 110 requests the digital certificate 210 from the cloud application 145(2). At 340, the cloud application 145(2) sends the digital certificate 210 to the CASB 110. If the digital certificate cannot be verified, the CASB 110 may determine that the cloud application 145(2) is untrustworthy, cease generating the application fingerprint 200, and (for example) prevent the user from accessing the cloud application 145(2). If the CASB verifies the digital certificate 210, the CASB 110 stores the digital certificate 210 in the application fingerprint 200.

Operations 345 and 350 relate to the probe URL and response hash 215 in the application fingerprint 200. As mentioned, CASB 110 may send one or more prompts to the cloud application 145(2), and may receive, from the cloud application 145(2), one or more responses reflecting current empirical data obtained from the cloud application 145(2). At 345, the CASB 110 sends a probe URL created based on an absolute domain name corresponding to the cloud application 145(2). The probe URL is an example of a prompt for one or more responses. At 350, the CASB 110 receives a response page from the cloud application 145(2) in response to the probe URL. The response page is an example of one or more responses.

There are many ways to create a probe URL from an absolute domain name. For example, if the user accesses a main URL, the cloud application 145(2) may redirect the user to a landing page, which provides a handle to authenticate/verify/admit the user. The probe URL may be, for example, the main URL, the URL of the landing page, or a sub-URL based on a string input by the user. If the main URL is initially selected as the probe URL but is forbidden, the CASB 110 may modify the main URL to generate a probe URL, or the CASB 110 may use the forbidden main URL as the probe URL.

After receiving a response page from the cloud application 145(2), the CASB 110 may download the response page. If the response page is dynamic (i.e., if the response page has any dynamic features), the CASB 110 may remove all dynamic values (e.g., with NULL value/string), thereby generating a static response page. The CASB may then generate a hash (e.g., Secure Hash Algorithm 128/256/512/ etc.) of the static response page. If the CASB 110 used a forbidden main URL as the probe URL, the failure code may be used as a payload for the hash. As mentioned, the CASB 100 may store the probe URL and response hash 215 in the application fingerprint 200.

Operations 355 and 360 relate to the negative stimulus and negative response 220 in the application fingerprint 200. At 355, the CASB 110 sends a negative stimulus to the cloud application 145(2). The negative stimulus is an example of a prompt for one or more responses. At 360, the CASB 110 receives a response to the negative stimulus from the cloud application 145(2). The response to the negative stimulus is an example of one or more responses.

A negative stimulus is intended to prompt a negative response (e.g., a failure code, page redirect, etc.) from the cloud application 145(2). In one example, a negative stimulus may be an arbitrary URL. More specifically, at 355, the CASB 110 may send, to the cloud application 145(2), an arbitrary URL created based on a base URL corresponding to the cloud application 145(2). In this example, at 360, the CASB 110 receives a negative response (e.g., a known failure code, a page redirect a page within the domain corresponding to the cloud application 145(2), a known index page, etc.) from the cloud application 145(2) in response to the arbitrary URL. The CASB 110 may store the arbitrary URL and the negative response in the application fingerprint 200 as the negative stimulus and negative response 220.

Another example of a negative stimulus is a request to access an explicit port. In this example, the CASB 110 may determine whether a URL corresponding to the cloud application 145(2) includes an explicit port. If the CASB 110 determines that the URL includes an explicit port, at 355 the CASB may send an HTTP (instead of a Hypertext Transfer Protocol Secure (HTTPS)) request to access the explicit port. In this example, at 360, the CASB 110 receives a negative response (e.g., a failure code, a page redirect to the HTTPS URL, etc.) from the cloud application 145(2) in response to the request to access the explicit port. The CASB 110 may store the URL and the negative response in the application fingerprint 200 as the negative stimulus and negative response 220.

After 360, the cloud application 145(2) may issue a domain name redirect to the enterprise device 305. In proxy mode, the cloud application 145(2) sends the redirect to the CASB 110. In API mode, the cloud application 145(2) sends the redirect directly to the enterprise device 305. If the redirect is not for the same domain as the user access request (315), the CASB 110 may repeat the operations associated with operations 320-360, but for the redirected domain name instead of the user access request.

It will be understood that the application fingerprint 200 may include any one or more of the verified SSL certificate 205, the verified application digital certificate 210, the probe URL and response hash 215, and the negative stimulus and negative response 220. After generating the application fingerprint 200, the CASB 110 may associate the application fingerprint 200 with the cloud application 145(2), a version of the cloud application 145(2), and a domain name of the cloud application 145(2). For example, the CASB 110 may store the application fingerprint 200 in a database against the cloud application 145(2), the version, and the domain name. If operation 315 is the first time a cloud application 145(2) is being accessed from the enterprise network 105, the application fingerprint 200 may be the first fingerprint generated for cloud application 145(2). If the cloud application 145(2) has been previously accessed from the enterprise network 105, a previous application fingerprint for the cloud application 145(2) may exist.

If there is a previous application fingerprint, the CASB 110 may determine whether the application fingerprint 200 matches the previous application fingerprint. A difference between the existing application fingerprint and the new application fingerprint may indicate that the cloud application has "gone rogue" and poses a security threat to a user/enterprise. For instance, the CASB 110 may determine whether the probe URL and response hash 220 match a previous probe URL and response hash of the previous application fingerprint. More specifically, the CASB may determine whether the hash of the response page (stored in application fingerprint 200) matches a previous response hash of a previous response page received from the cloud application 145(2) in response to a previous probe URL (stored in the previous application fingerprint).

The CASB 110 may additionally/alternatively determine whether the negative stimulus and negative response 220 match a previous negative stimulus and negative response of the previous application fingerprint. For example, if the negative stimulus is an arbitrary URL, the CASB 110 may determine whether the negative response (e.g., failure code, redirect page, index page, etc.) matches a previous negative response (e.g., previous failure code, previous redirect page, previous index page, etc.) received from the cloud application 145(2) in response to a previous arbitrary URL. The arbitrary URL may be the same as the previous arbitrary URL. Similarly, if the negative stimulus is a request to access an explicit port, the CASB 110 may determine whether the negative response matches a previous negative stimulus received from the cloud application 145(2) in response to a previous request to access the explicit port.

Comparing a current application fingerprint to the previous application fingerprint allows the CASB 110 to determine whether the cloud application 145(2) has gone rogue since the CASB 110 generated the previous application fingerprint. As mentioned, if the current application fingerprint does not match the previous application fingerprint, this indicates that the cloud application 145(2) has gone rogue, and CASB 110 may enforce a security policy against the cloud application 145(2). For example, the CASB 110 may deny access to the cloud application 145(2), send an alert to the user or a network administrator, or log the discrepancy in a database.

The CASB 110 may perform application fingerprinting techniques described herein when a session between a client and a cloud application is not active. The duration of a session may be configurable. When the session is not active, the CASB 110 may create a new application fingerprint and compare the new application fingerprint against a previously existing application fingerprint. A change in the version of the application or in a certificate for the application may prompt the CASB 110 to create and store a new application fingerprint, and may also prompt the CASB 110 to enforce a security policy against the cloud application.

Figure 4:
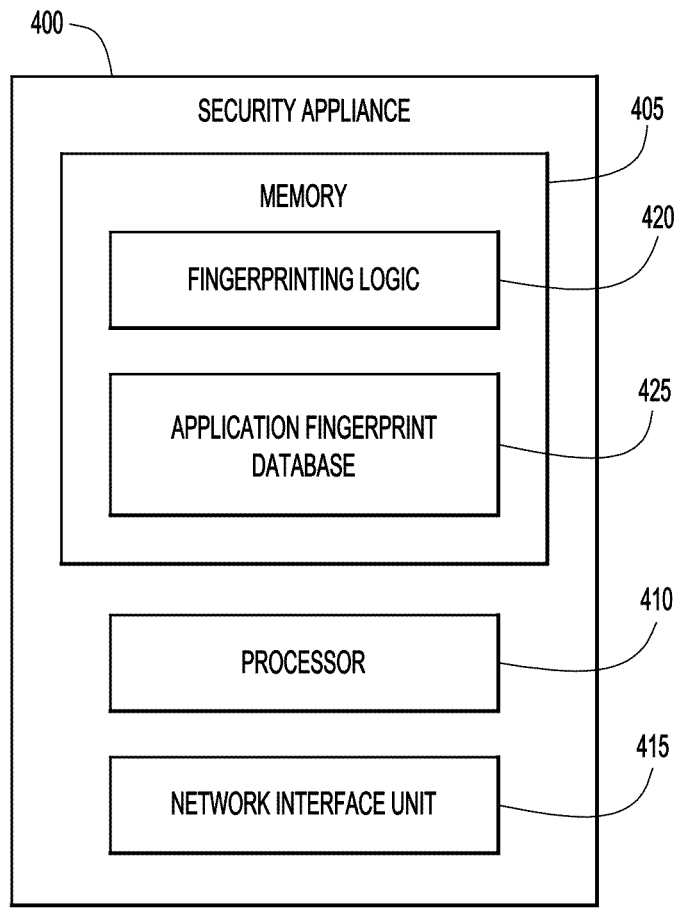
FIG. 4 is a block diagram of a security application configured to execute application fingerprinting techniques, according to an example embodiment.

FIG. 4 is a block diagram of a security appliance device 400 on which the CASB functions may be executed. In this example, the security appliance device 400 includes a memory 405, one or more processors 410, and a network interface unit 415. The memory 405 includes fingerprinting logic 420 and application fingerprint database 425, which includes application fingerprints corresponding to numerous cloud applications and/or previous application fingerprints. The one or more processors 410 are configured to execute instructions stored in the memory 405 (e.g., fingerprinting logic 420). When executed by the one or more processors 410, the fingerprinting logic 420 enables the security appliance device 400 to perform the operations associated with fingerprinting module 140 (FIG. 1).

The memory 405 may be read only memory (ROM), random access memory (RAM), magnetic disk storage media devices, optical storage media devices, flash memory devices, electrical, optical, or other physical/tangible memory storage devices. Thus, in general, the memory 405 may comprise one or more tangible (non-transitory) computer readable storage media (e.g., a memory device) encoded with software comprising computer executable instructions and when the software is executed (by the processor 410) it is operable to perform the operations described herein.

Figure 5:
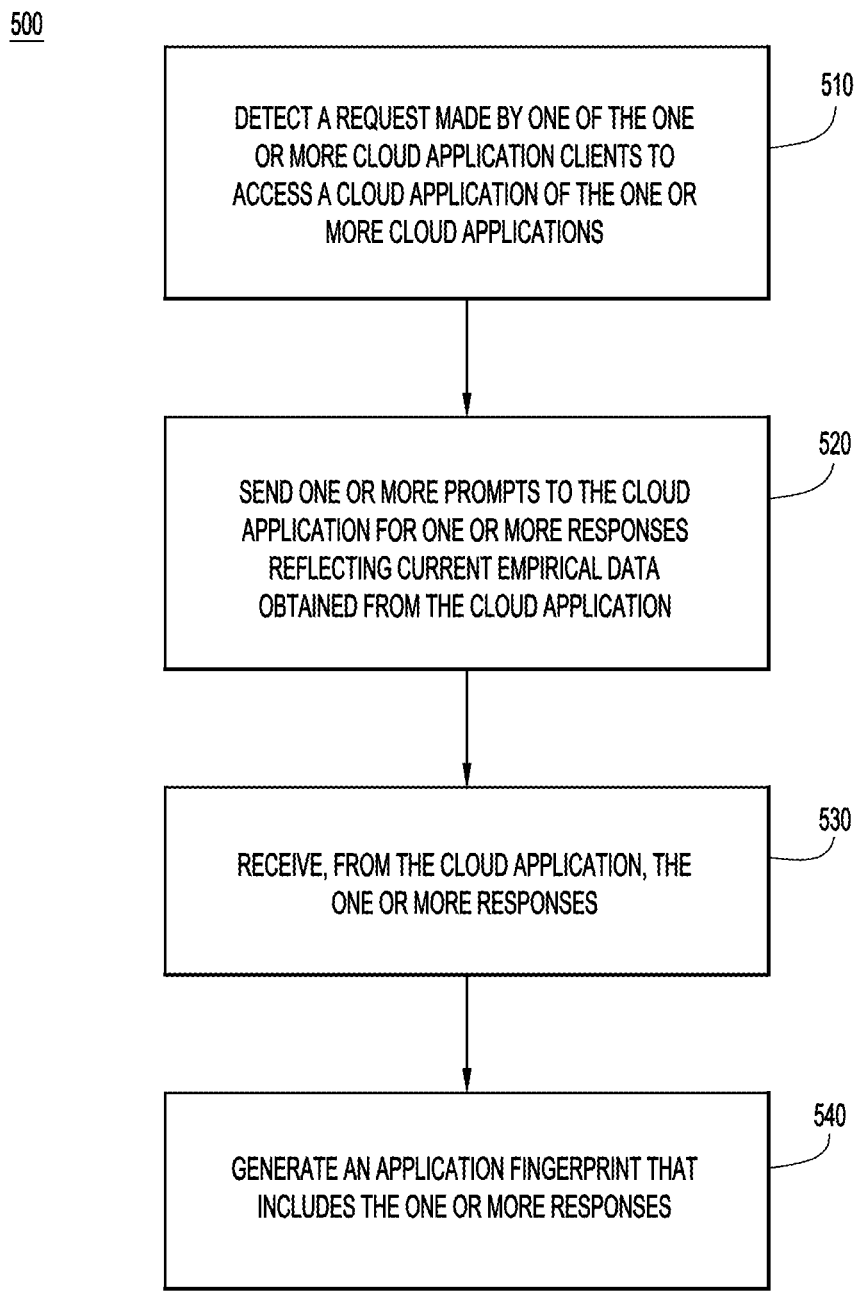
FIG. 5 is a flowchart of a cloud application fingerprinting method in accordance with an example embodiment.

FIG. 5 is a flowchart 500 of a method in accordance with examples presented herein. The method is executed by a security application (e.g., CASB 110) running on a security appliance device that interfaces one or more cloud application clients in an enterprise network and one or more cloud applications. At 510, the security application detects a request made by one of the one or more cloud application clients to access a cloud application of the one or more cloud applications. At 520, the security application sends one or more prompts to the cloud application for one or more responses reflecting current empirical data obtained from the cloud application. At 530, the security application receives, from the cloud application, the one or more responses. At 540, the security application generates an application fingerprint that includes the one or more responses.

In summary, a cloud application fingerprint may be used as follows. The security application (CASB) stores a fingerprint in a database against an application, version and domain. The security application maintains a session for a given application. The fingerprinting process is done when a session is not active. The duration of a session can be a configurable action of the security application. When a session is not active, a new fingerprint is created and compared against an existing fingerprint. A change detected based on this comparison will indicate a threat and it is subjected to a security policy, such as denial, alert, logging, etc. A version change or certificate change will cause a new fingerprint to be created and stored for further use, but this may result in a security event that is subjected to a security policy, such as denial, alert, logging, etc.

The techniques presented herein provide "trust but verify" support on a security broker for cloud applications through application fingerprinting. Cloud application trust verification extends the security perimeter to the cloud. Security events generated by these techniques are subjected to cloud application security broker security policies. An external user cannot guess/predict an application fingerprint.

Rogue applications are prevented from penetrating enterprise network/users. No separate periodic enforcement is required because this is built-in and available in real-time. Cloud application security broker enforcement is governed by enterprise policy and policy actions which depend upon an event, domain, and an application. Application fingerprints may be applied to SaaS applications and other cloud services that use HTTP.

In one form, a method is provided. The method comprises: at a security application that interfaces one or more cloud application clients in an enterprise network and one or more cloud applications: detecting a request made by one of the one or more cloud application clients to access a cloud application of the one or more cloud applications; sending one or more prompts to the cloud application for one or more responses reflecting current empirical data obtained from the cloud application; receiving, from the cloud application, the one or more responses; and generating an application fingerprint that includes the one or more responses.

In another form, an apparatus is provided. The apparatus comprises: a network interface unit to interface one or more cloud application clients in an enterprise network and one or more cloud applications; a memory; and one or more processors coupled to the memory, wherein the one or more processors are configured to: detect a request made by one of the one or more cloud application clients to access a cloud application of the one or more cloud applications; send one or more prompts to the cloud application for one or more responses reflecting current empirical data obtained from the cloud application; receive, from the cloud application, the one or more responses; and generate an application fingerprint that includes the one or more responses.

In another form, one or more non-transitory computer readable storage media are provided. The non-transitory computer readable storage media are encoded with instructions that, when executed by a processor, cause the processor to: at a security application that interfaces one or more cloud application clients in an enterprise network and one or more cloud applications: detect a request made by one of the one or more cloud application clients to access a cloud application of the one or more cloud applications; send one or more prompts to the cloud application for one or more responses reflecting current empirical data obtained from the cloud application; receive, from the cloud application, the one or more responses; and generate an application fingerprint that includes the one or more responses.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a security application that interfaces one or more cloud application clients in an enterprise network and one or more cloud applications:
detecting a request made by one of the one or more cloud application clients to access a cloud application of the one or more cloud applications;
sending, to the cloud application, a probe uniform resource locator created based on an absolute domain name corresponding to the cloud application for one or more responses reflecting current empirical data obtained from the cloud application;
receiving, from the cloud application, a response page in response to the probe uniform resource locator;
generating a hash of the response page;
generating an application fingerprint that includes the hash of the response page;
determining whether the application fingerprint matches a previous application fingerprint that includes one or more previous responses reflecting empirical data previously obtained from the cloud application by determining whether the hash of the response page matches a previous hash of a previous response page received from the cloud application in response to a previous probe uniform resource locator; and
if the application fingerprint does not match the previous application fingerprint, enforcing a security policy with respect to the cloud application.

2. The method of claim 1, further comprising:
associating the hash of the response page with the cloud application.

3. The method of claim 1, further comprising:
before sending the probe uniform resource locator, determining whether a third-party signed application digital certificate is available.

4. The method of claim 3, further comprising:
if the digital certificate is available, obtaining the digital certificate; and
verifying the digital certificate.

5. The method of claim 1, further comprising:
before sending the probe uniform resource locator, verifying, via a domain name service, a domain name included in the request.

6. The method of claim 5, further comprising:
receiving, from the cloud application, a secure sockets layer certificate; and
verifying the secure sockets layer certificate.

7. The method of claim 1, further comprising:
associating the hash of the response page with a version of the cloud application.

8. The method of claim 1, further comprising:
associating the hash of the response page with a domain name of the cloud application.

9. An apparatus comprising:
a network interface unit to interface one or more cloud application clients in an enterprise network and one or more cloud applications;
a memory; and
one or more processors coupled to the memory, wherein the one or more processors are configured to:
detect a request made by one of the one or more cloud application clients to access a cloud application of the one or more cloud applications;
send, to the cloud application, an arbitrary uniform resource locator created based on a base uniform resource locator corresponding to the cloud application for one or more responses reflecting current empirical data obtained from the cloud application;
receive, from the cloud application, a failure code, a page redirect, or an index page in response to the arbitrary uniform resource locator;
generate an application fingerprint that includes the failure code, the page redirect, or the index page;
determine whether the application fingerprint matches a previous application fingerprint that includes one or more previous responses reflecting empirical data previously obtained from the cloud application by determining whether the failure code, the page redirect, or the index page match a previous failure code, a previous page redirect, or a previous index page received from the cloud application in response to a previous arbitrary uniform resource locator; and
if the application fingerprint does not match the previous application fingerprint, enforce a security policy with respect to the cloud application.

10. The apparatus of claim 9, wherein the one or more processors are further configured to:
associate the failure code, the page redirect, or the index page with the cloud application.

11. The apparatus of claim 9, wherein the one or more processors are further configured to:
associate the failure code, the page redirect, or the index page with a version of the cloud application.

12. The apparatus of claim 9, wherein the one or more processors are further configured to:
associate the failure code, the page redirect, or the index page with a domain name of the cloud application.

13. The apparatus of claim 9, wherein the one or more processors are further configured to:
before sending the arbitrary uniform resource locator, determine whether a third-party signed application digital certificate is available.

14. The apparatus of claim 13, wherein the one or more processors are further configured to:
if the digital certificate is available, obtain the digital certificate; and
verify the digital certificate.

15. The apparatus of claim 9, wherein the one or more processors are further configured to:
before sending the arbitrary uniform resource locator, verify, via a domain name service, a domain name included in the request.

16. The apparatus of claim 15, wherein the one or more processors are further configured to:
receive, from the cloud application, a secure sockets layer certificate; and
verify the secure sockets layer certificate.

17. One or more non-transitory computer readable storage media encoded with instructions that, when executed by a processor, cause the processor to:
at a security application that interfaces one or more cloud application clients in an enterprise network and one or more cloud applications:
detect a request made by one of the one or more cloud application clients to access a cloud application of the one or more cloud applications;
determine whether a uniform resource locator corresponding to the cloud application includes an explicit port; and
if it is determined that the uniform resource locator includes the explicit port:
send, to the cloud application, a request to access the explicit port included in the uniform resource locator corresponding to the cloud application for one or more responses reflecting current empirical data obtained from the cloud application;
receive, from the cloud application, the a failure code or a page redirect;
generate an application fingerprint that includes the failure code or the page redirect;
determine whether the application fingerprint matches a previous application fingerprint that includes one or more previous responses reflecting empirical data previously obtained from the cloud application by determining whether the failure code or the page redirect match a previous failure code or a previous page redirect received from the cloud application in response to a previous request to access the explicit port; and
if the application fingerprint does not match the previous application fingerprint, enforce a security policy with respect to the cloud application.

18. The one or more non-transitory computer readable storage media of claim 17, wherein the instructions further cause the processor to:
associate the failure code or the page redirect with the cloud application, a version of the cloud application, and a domain name of the cloud application.

19. The one or more non-transitory computer readable storage media of claim 17, wherein the instructions further cause the processor to:
before sending the request to access the explicit port, determine whether a third-party signed application digital certificate is available;

if the digital certificate is available, obtain the digital certificate; and verify the digital certificate.

20. The one or more non-transitory computer readable storage media of claim 17, wherein the instructions further cause the processor to:

before sending the request to access the explicit port, verify, via a domain name service, a domain name included in the request;

receive, from the cloud application, a secure sockets layer certificate; and verify the secure sockets layer certificate.

\* \* \* \* \*